United States Patent
Kim

(10) Patent No.: US 12,524,173 B2
(45) Date of Patent: Jan. 13, 2026

(54) SEMICONDUCTOR MEMORY DEVICE AND METHOD FOR PROGRAMMING SELECT TRANSISTORS

(71) Applicant: SK hynix Inc., Icheon-si (KR)

(72) Inventor: Jae Woong Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 192 days.

(21) Appl. No.: 18/457,202

(22) Filed: Aug. 28, 2023

(65) Prior Publication Data
US 2024/0302982 A1 Sep. 12, 2024

(30) Foreign Application Priority Data

Mar. 9, 2023 (KR) .................. 10-2023-0031253

(51) Int. Cl.
| | | |
|---|---|---|
| G11C 11/04 | (2006.01) | |
| G06F 3/06 | (2006.01) | |
| G11C 11/56 | (2006.01) | |
| G11C 16/04 | (2006.01) | |
| G11C 16/10 | (2006.01) | |
| G11C 16/34 | (2006.01) | |

(52) U.S. Cl.
CPC .............. G06F 3/064 (2013.01); G06F 3/061 (2013.01); G06F 3/0679 (2013.01); G11C 11/5628 (2013.01); G11C 16/0483 (2013.01); G11C 16/10 (2013.01); G11C 16/3459 (2013.01)

(58) Field of Classification Search
CPC ........ G06F 3/064; G06F 3/061; G06F 3/0679; G11C 11/5628; G11C 16/0483; G11C 16/10; G11C 16/3459; G11C 16/3431; G11C 16/12; G11C 16/3418; G11C 16/3404
USPC ...................................................... 365/185.01
See application file for complete search history.

(56) References Cited

U.S. PATENT DOCUMENTS 10,153,051 B1 * 12/2018 Chen .................. G11C 16/0483
10,163,511 B2 * 12/2018 Nam .................... G11C 11/4087

FOREIGN PATENT DOCUMENTS

| KR | 1020170092959 A | 8/2017 |
| KR | 1020200090031 A | 7/2020 |
| KR | 1020200141304 A | 12/2020 |

* cited by examiner

Primary Examiner — Tha-O H Bui
(74) Attorney, Agent, or Firm — WILLIAM PARK AND ASSOCIATES LTD.

(57) ABSTRACT

A semiconductor memory device, and a method of operation, includes a memory block including a plurality of memory strings. The semiconductor memory device also includes a peripheral circuit performing a main program operation on drain select transistors included in the memory block, and a test program operation and a threshold voltage monitoring operation on memory cells included in the memory block. The semiconductor memory device further includes control logic controlling the peripheral circuit to detect a disturb susceptible memory string, among the plurality of memory strings, based on a result of performing the threshold voltage monitoring operation on the memory cells, and to perform an additional program operation on a drain select transistor included in the disturb susceptible memory string.

20 Claims, 9 Drawing Sheets

SEMICONDUCTOR MEMORY DEVICE AND METHOD FOR PROGRAMMING SELECT TRANSISTORS

CROSS-REFERENCE TO RELATED APPLICATION

The present application claims priority under 35 U.S.C. § 119 (a) to Korean patent application number 10-2023-0031253 filed on Mar. 9, 2023, in the Korean Intellectual Property Office, the entire disclosure of which is incorporated by reference herein.

BACKGROUND

1. Technical Field

Various embodiments of the present disclosure relate to an electronic device, and more particularly, to a semiconductor memory device and a method of operating the same.

2. Related Art

A storage device may store data in response to the control of a host device such as a computer, a smartphone, or a smartpad. Examples of the storage device may include a device for storing data in a magnetic disk, such as a hard disk drive (HDD), and a device for storing data in a semiconductor memory, such as a solid state drive (SSD) or a memory card, especially in nonvolatile memory.

A storage device may include a memory device that stores data and a memory controller that controls the memory device. A memory device may be classified as a volatile memory device or a nonvolatile memory device. Nonvolatile memory devices may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), and ferroelectric RAM (FRAM).

SUMMARY

Some embodiments of the present disclosure are directed to a semiconductor memory device programming a select transistor based on the influence of disturb over memory cells, and a method of operating the semiconductor memory device.

According to an embodiment, a semiconductor memory device may include: a memory block including a plurality of memory strings; a peripheral circuit configured to perform a main program operation on drain select transistors included in the memory block, and perform a test program operation and a threshold voltage monitoring operation on memory cells included in the memory block; and control logic configured to control the peripheral circuit to detect a disturb susceptible memory string, among the plurality of memory strings, based on a result of performing the threshold voltage monitoring operation on the memory cells, and configured to perform an additional program operation on a drain select transistor included in the disturb susceptible memory string.

According to an embodiment, a semiconductor memory device may include: a memory block including a plurality of pages; a peripheral circuit configured to perform a main program operation on drain select transistors included in the memory block, configured to perform a test program operation on a selected page among the plurality of pages, and configured to perform a threshold voltage monitoring operation on the selected page; and control logic configured to control the peripheral circuit to detect disturb susceptible memory cells on the basis of a result of performing the threshold voltage monitoring operation on the selected page, and configured to perform an additional program operation on a plurality of drain select transistor corresponding to the disturb susceptible memory cells among the drain select transistors.

According to an embodiment, a method of operating a semiconductor memory device may include: performing a main program operation on a plurality of drain select transistors included in a selected memory block; performing a test program operation on at least one selected page among a plurality of pages included in the selected memory block; performing a threshold voltage monitoring operation on the at least one selected page; detecting a memory string including memory cells having increased threshold voltages as a result of the threshold voltage monitoring operation as a disturb susceptible memory string; and performing an additional program operation on a drain select transistor included in the disturb susceptible memory string.

DETAILED DESCRIPTION

Specific structural or functional descriptions of examples of embodiments in accordance with concepts which are disclosed in this specification are illustrated only to describe the examples of embodiments in accordance with the concepts and the examples of embodiments in accordance with the concepts may be carried out by various forms but the descriptions are not limited to the examples of embodiments described in this specification.

Hereinafter, embodiments of the present disclosure will be described in detail with reference to the accompanying drawings in order for those skilled in the art to be able to implement the technical spirit of the present disclosure.

Figure 1:
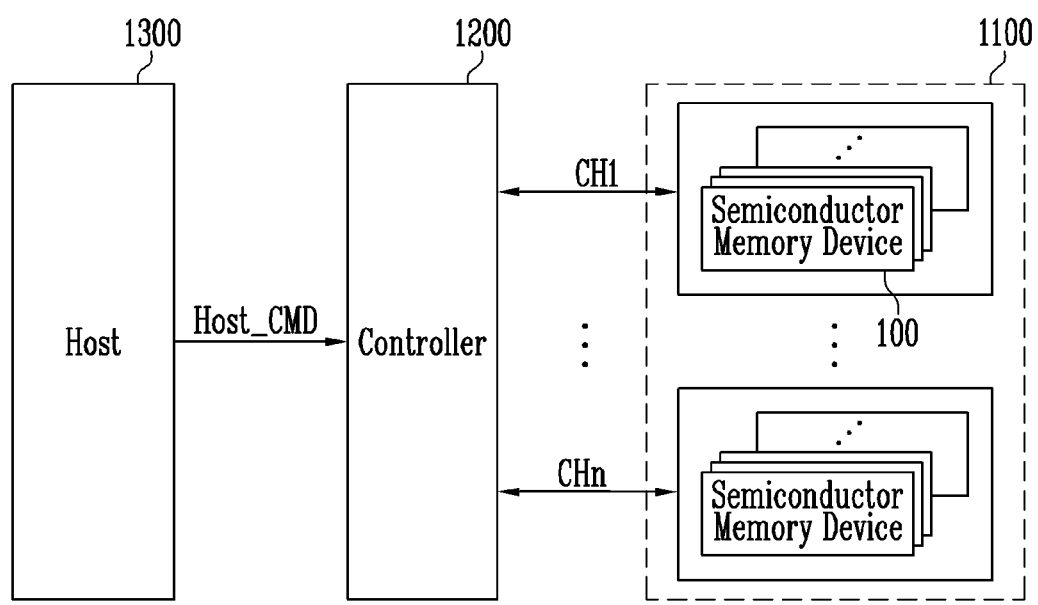
FIG. 1 is a block diagram illustrating a memory system including a semiconductor memory device according to an embodiment of the present disclosure.

FIG. 1 is a block diagram illustrating a memory system 1000 including semiconductor memory devices 100 according to an embodiment of the present disclosure.

Referring to FIG. 1, the memory system 1000 may include a memory device 1100, a controller 1200, and a host 1300. The memory device 1100 may include a plurality of semiconductor memory devices 100. The plurality of semiconductor memory devices 100 may be divided into a plurality of groups. According to an embodiment of the present disclosure, it is shown that the host 1300 is included in the memory system 1000. However, the memory system 1000 may include only the controller 1200 and the memory device 1100, and the host 1300 may be disposed outside the memory system 1000.

As shown in FIG. 1, the plurality of groups of the memory device 1100 may communicate with the controller 1200 through first to nth channels CH1 to CHn, respectively. Each of the semiconductor memory devices 100 will be described with reference to FIG. 2.

Each of the plurality of groups which include the semiconductor memory devices 100 may be configured to communicate with the controller 1200 through a single common channel. The controller 1200 may be configured to control the plurality of semiconductor memory devices 100 of the memory device 1100 through the plurality of channels CH1 to CHn.

The controller 1200 may be coupled between the host 1300 and the memory device 1100. The controller 1200 may be configured to access the memory device 1100 in response to a request from the host 1300. For example, the controller 1200 may be configured to control read, write, erase, and background operations of the memory device 1100 in response to a host command Host_CMD which is received from the host 1300. The host 1300 may transfer data and an address along with the host command Host_CMD during a write operation, and may transfer an address together with the host command Host_CMD during a read operation. The controller 1200 may be configured to provide an interface between the memory device 1100 and the host 1300. The controller 1200 may run firmware for controlling the memory device 1100.

The host 1300 may include portable electronic devices such as PDAs, PMPs, MP3 players, cameras, camcorders, or cellular phones. The host 1300 may request a write operation, a read operation, and an erase operation of the memory system 1000 through the host command Host_CMD. The host 1300 may transfer the host command Host_CMD corresponding to a write command, data, and an address for a write operation to the controller 1200. The host 1300 may transfer the host command Host_CMD corresponding to a read command and an address to the controller 1200 for a read operation. The address may be a logical address.

The controller 1200 and the memory device 1100 may be integrated in one semiconductor device. According to an embodiment, the controller 1200 and the memory device 1100 may be integrated into a single semiconductor device to form a memory card. For example, the controller 1200 and the memory device 1100 may be integrated into a single semiconductor device and form a memory card such as a personal computer memory card international association (PCMCIA), a compact flash (CF) card, a smart media card (SM or SMC), a memory stick multimedia card (MMC, RS-MMC, or MMCmicro), a SD card (SD, miniSD, microSD, or SDHC), a universal flash storage (UFS), and the like.

The controller 1200 and the memory device 1100 may be integrated into a single semiconductor device to form a solid state drive (SSD). The SSD may include a storage device for storing data in the semiconductor memory device 100.

In another example, the memory system 1000 may be provided as one of various elements of an electronic device such as a computer, a ultra-mobile PC (UMPC), a workstation, a net-book, a personal digital assistants (PDA), a portable computer, a web tablet, a wireless phone, a mobile phone, a smart phone, an e-book, a portable multimedia player (PMP), a game console, a navigation device, a black box, a digital camera, a 3-dimensional television, a digital audio recorder, a digital audio player, a digital picture player, a digital picture recorder, a digital video recorder, a device capable of transmitting/receiving information in an wireless environment, one of various devices for forming a home network, one of various electronic devices for forming a computer network, one of various electronic devices for forming a telematics network, an RFID device, or one of various elements for forming a computing system.

In an embodiment, the memory device 1100 or the memory system 1000 may be embedded in various forms of packages. For example, the memory device 1100 or the memory system 1000 may be mounted using packages such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), system in package (SIP), multi chip package (MCP), wafer-level fabricated package (WFP), wafer-level processed stack package (WSP), and the like.

Figure 2:
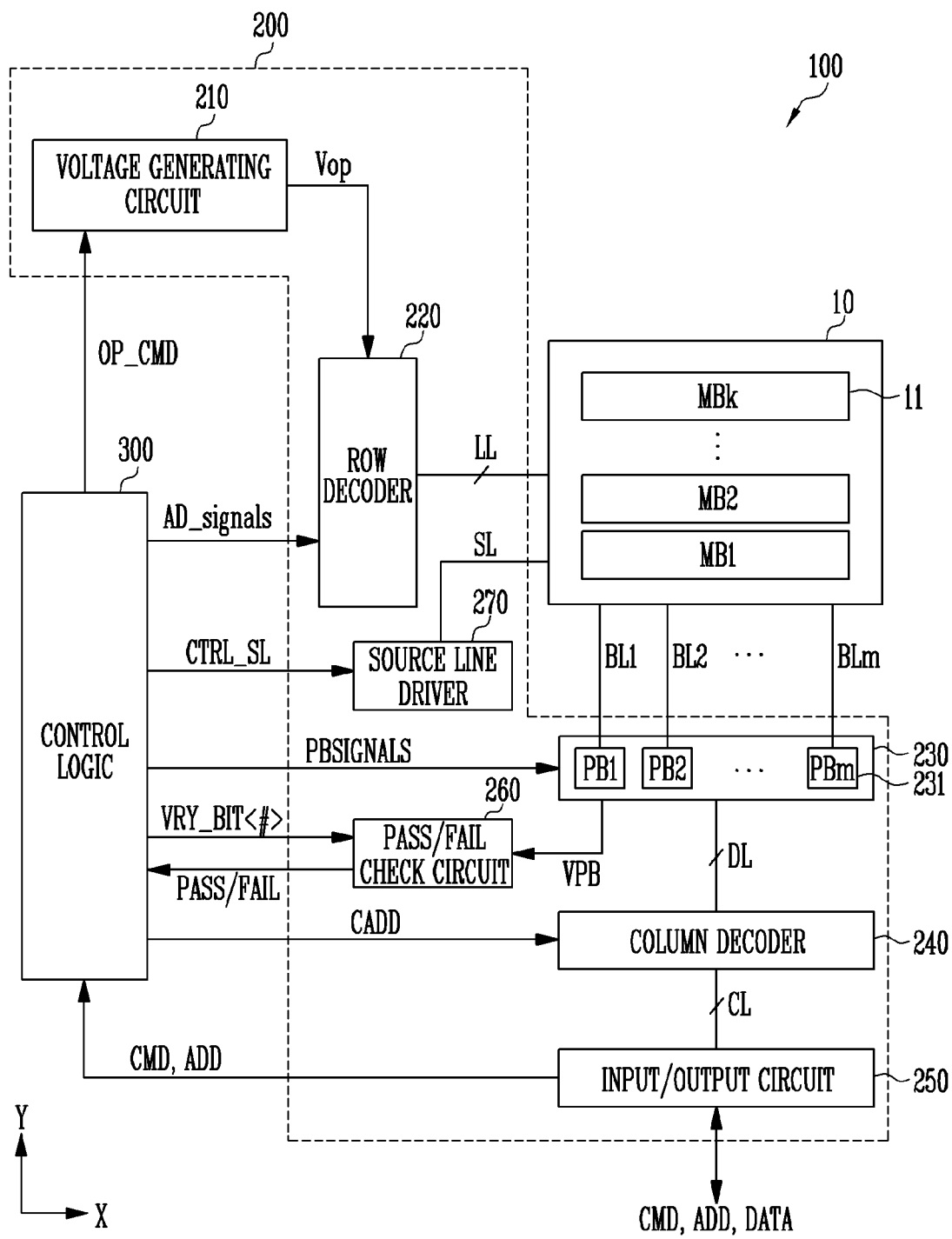
FIG. 2 is a diagram illustrating a semiconductor memory device according to an embodiment of the present disclosure.

FIG. 2 is a diagram illustrating the semiconductor memory device 100 according to an embodiment of the present disclosure.

Referring to FIG. 2, the semiconductor memory device 100 may include a memory cell array 10 which stores data. The semiconductor memory device 100 may include peripheral circuits 200 configured to perform a program operation for storing data in the memory cell array 10, a read operation for outputting the stored data, and an erase operation for erasing the stored data. The semiconductor memory device 100 may include control logic 300 for controlling the peripheral circuits 200 in response to control of the controller 1200 of FIG. 1.

The memory cell array 10 may include memory blocks MB1 to MBK, where k is a positive integer. Each of the memory blocks (MB1 to MBk) 11 may be coupled to local lines LL and bit lines BL1 to BLm, where m is a positive integer. For example, the local lines LL may include a first select line, a second select line, and a plurality of word lines arranged between the first and second select lines. In addition, the local lines LL may include dummy lines which are arranged between the first select line and the word lines and between the second select line and the word lines. The first select line may be a source select line and the second select line may be a drain select line. For example, the local lines LL may include word lines, drain and source select lines, and source lines SL. For example, the local lines LL may further include dummy lines. For example, the local lines LL may further include pipe lines. The local lines LL may be coupled to the memory blocks MB1 to MBk, i.e., memory blocks 11, respectively, and the bit lines BL1 to BLm may be commonly coupled to the memory blocks 11. The memory blocks (MB1 to MBK) 11 may have a two-dimensional (2D) structure or a three-dimensional (3D) structure. For example, in the 2D memory blocks 11, memory cells may be arranged in parallel with a substrate. For example, in the 3D memory blocks 11, memory cells may be stacked in a vertical direction to the substrate.

The peripheral circuits 200 may be configured to perform program, read, and erase operations on a selected memory block 11 in response to control of the control logic 300. In addition, the control logic 300 may control the peripheral circuits 200 to perform a threshold voltage monitoring operation on memory cells corresponding to at least one page included in the selected memory block 11, or all memory cells included in the selected memory block 11. For example, the peripheral circuits 200 may include a voltage generating circuit 210, a row decoder 220, a page buffer group 230, a column decoder 240, an input/output circuit 250, a pass/fail check circuit 260, and a source line driver 270.

The voltage generating circuit 210 may generate various operating voltages Vop used to perform a program operation, a read operation, an erase operation, and a threshold voltage monitoring operation in response to an operation signal OP_CMD. In addition, the voltage generating circuit 210 may selectively discharge the local lines LL in response to the operation signal OP_CMD. For example, the voltage generating circuit 210 may generate a program voltage, a verify voltage, a pass voltage, a monitoring read voltage, and a select transistor operating voltage in response to the control of the control logic 300. In addition, the voltage generating circuit 210 may generate a main program voltage and an additional program voltage to be applied to the first and second select lines coupled to the source select transistor and the drain select transistor, respectively, during a program operation of the drain select transistor and the source select transistor.

The row decoder 220 may transfer the operating voltages Vop to the local lines LL coupled to the selected memory block 11 in response to row decoder control signals AD_signals. For example, the row decoder 220 may selectively apply the operating voltages Vop (e.g., a program voltage, a verify voltage, a pass voltage, and a monitoring read voltage) generated by the voltage generating circuit 210 to word lines of the local lines LL in response to the row decoder control signals AD_signals. In addition, the row decoder 220 may selectively apply the main program voltage or the additional program voltage generated by the voltage generating circuit 210 in response to the row decoder control signals AD_signals.

The row decoder 220 may apply a program voltage generated by the voltage generating circuit 210 to a selected word line, among the local lines LL, and may apply a pass voltage generated by the voltage generating circuit 210 to unselected word lines in response to the row decoder control signals AD_signals during a program voltage applying operation. In addition, the row decoder 220 may apply a read voltage generated by the voltage generating circuit 210 to a selected word line, among the local lines LL, and may apply a pass voltage generated by the voltage generating circuit 210 to unselected word lines in response to the row decoder control signals AD_signals during a read operation. In addition, the row decoder 220 may apply a monitoring read voltage generated by the voltage generating circuit 210 to a selected word line, among the local lines LL, and may apply a pass voltage generated by the voltage generating circuit 210 to unselected word lines in response to the row decoder control signals AD_signals during a threshold voltage monitoring operation. In addition, the row decoder 220 may apply the main program voltage to a second select line coupled to a drain select transistor, i.e., a drain select line during a main program voltage applying operation on the drain select transistor, and may apply an additional program voltage to a drain select line during an additional program voltage applying operation on the drain select transistor.

The page buffer group 230 may include a plurality of page buffers PB1 to PBm, i.e., page buffers 231 which are coupled to the bit lines BL1 to BLm. The page buffers 231 may operate in response to page buffer control signals PBSIG-NALS. For example, the page buffers PB1 to PBm, i.e., the page buffers 231 may temporarily store data program during a program operation, or may sense voltages or currents in the bit lines BL1 to BLm during a read operation, a verify operation, or a threshold voltage monitoring operation.

The column decoder 240 may transfer data between the input/output circuit 250 and the page buffer group 230 in response to a column address CADD. For example, the column decoder 240 may exchange data with the page buffers 231 through data lines DL, or may exchange data with the input/output circuit 250 through column lines CL.

The input/output circuit 250 may transfer an internal command CMD and an address ADD from the controller 1200 of FIG. 1 to the control logic 300, or may exchange data DATA with the column decoder 240.

The pass/fail check circuit 260 may generate a reference current in response to an allowable bit VRY_BIT<#> and may compare a sensing voltage VPB received from the page buffer group 230 with a reference voltage generated by the reference current to output a pass signal PASS or a fail signal FAIL during a read operation.

The source line driver 270 may be coupled to the memory cells included in the memory cell array 10 through the source line SL and control a voltage applied to the source line SL. The source line driver 270 may receive a source line control signal CTRL_SL from the control logic 300 and control a source line voltage applied to the source line SL on the basis of the source line control signal CTRL_SL.

The control logic 300 may control the peripheral circuits 200 by outputting an operation signal OP_CMD, the row decoder control signals AD_signals, the page buffer control signals PBSIGNALS, and the allowable bit VRY_BIT<#> in response to the internal command CMD and the address ADD. Further, the control logic 300 may determine whether the verify operation has passed or failed in response to the pass or fail signal PASS or FAIL. The control logic 300 may be implemented as hardware, software, or a combination of hardware and software. For example, the control logic 300 may be a control logic circuit operating in accordance with an algorithm and/or a processor executing control logic code.

Figure 3:
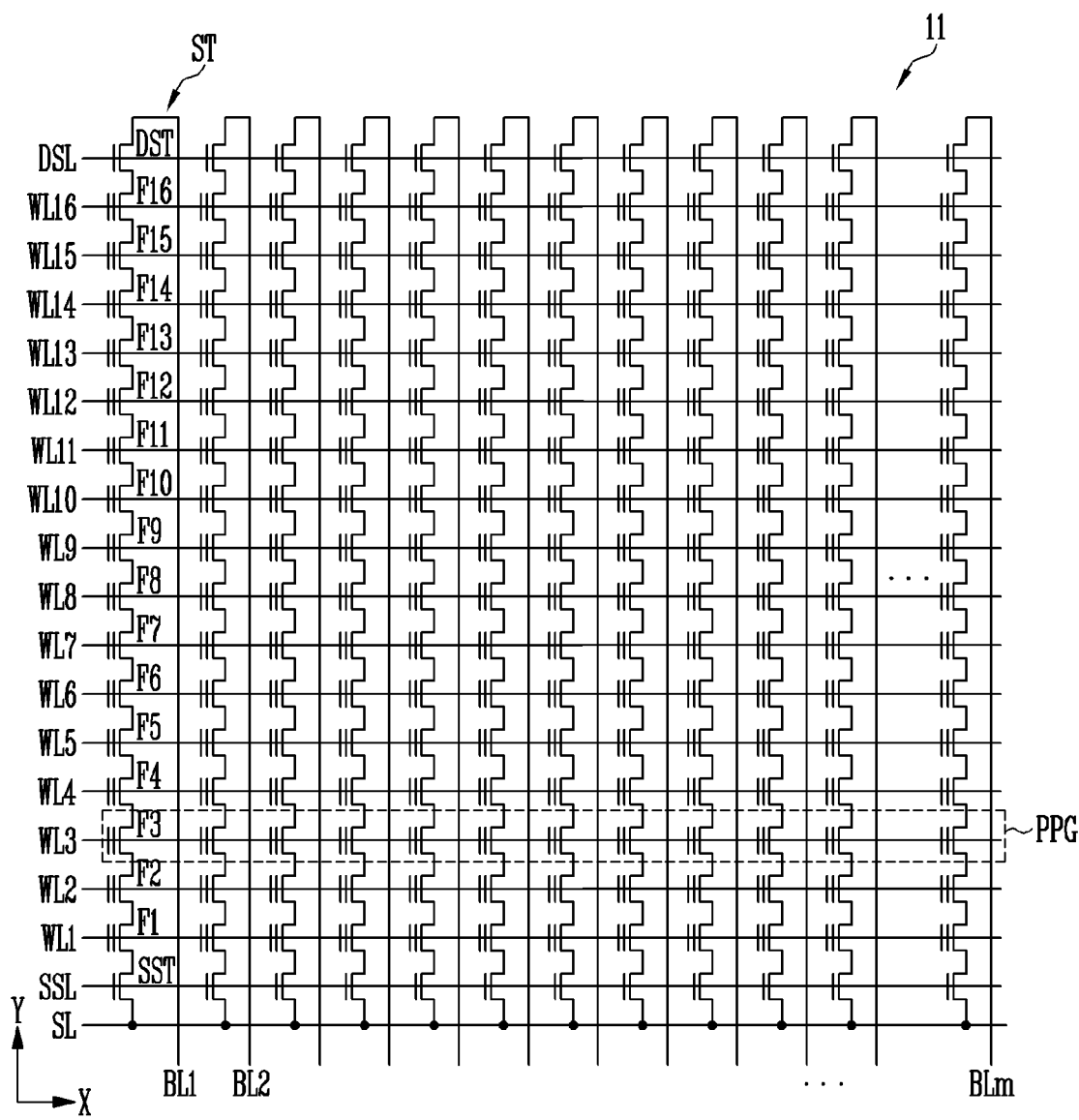
FIG. 3 is a diagram illustrating a memory block shown in FIG. 2.

FIG. 3 is a diagram illustrating the memory block 11 shown in FIG. 2.

Referring to FIG. 3, in the memory block 11, a plurality of word lines WL1 to WL16 arranged in parallel may be coupled between a first select line and a second select line. The first select line may be a source select line SSL and the second select line may be a drain select line DSL. More specifically, the memory block 11 may include a plurality of memory strings ST which are coupled between the bit lines BL1 to BLm and the source line SL. The bit lines BL1 to BLm may be coupled to the memory strings ST, respectively, and the source line SL may be commonly coupled to the memory strings ST. The memory strings ST may have the same configuration. Thus, the memory string ST which is coupled to the first bit line BL1 will be described in detail as an example.

The memory string ST may include a source select transistor SST, a plurality of memory cells F1 to F16, and a drain select transistor DST which are coupled in series to each other between the source line SL and the first bit line BL1. A single memory string ST may include at least one source select transistor SST and at least one drain select transistor DST, and may include more memory cells than the memory cells F1 to F16 as shown in FIG. 3.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of the source select transistors SST included in different memory strings ST may be coupled to the source select line SSL, gates of the drain select transistors DST may be coupled to the drain select line DSL, and gates of the memory cells F1 to F16 may be coupled to the plurality of word lines WL1 to WL16, respectively. A group of memory cells which are coupled to the same word line, among the memory cells included in the different memory strings ST, may be referred to as a physical page PPG. Therefore, the memory block 11 may include as many physical pages PPG as the number of word lines WL1 to WL16.

A single memory cell may store one bit of data. This memory cell is generally called a single-level cell (SLC). One physical page PPG may store one logical page (LPG) data. Data of the one logical page LPG may include as many data bits as the number of cells included in the single physical page PPG. In addition, a single memory cell may store two or more bits of data. This memory cell is typically referred to as a "multi-level cell (MLC)". One physical page PPG may store data corresponding to two or more logical pages LPG.

Figure 4:
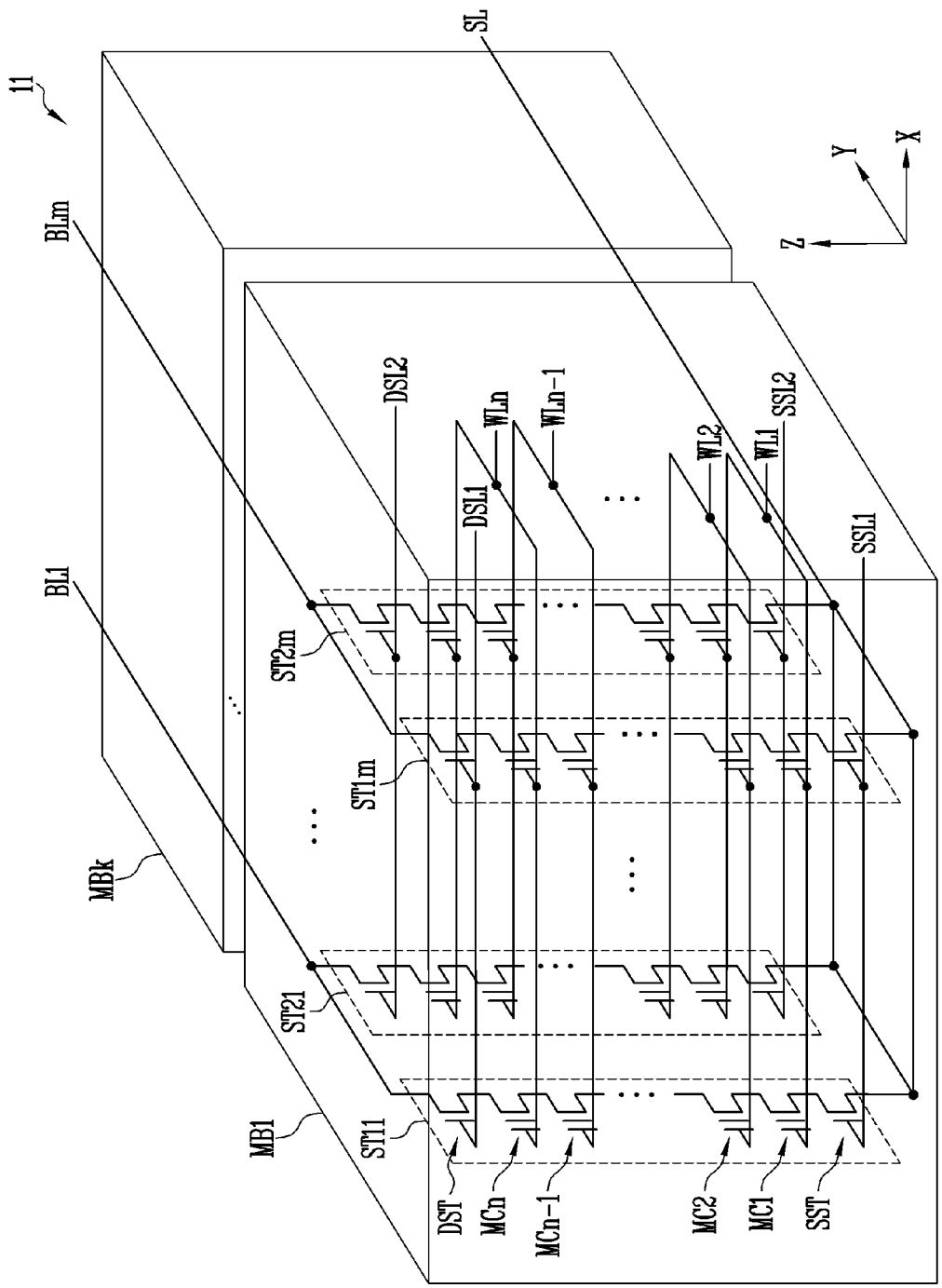
FIG. 4 is a diagram illustrating an embodiment of a three-dimensionally structured memory block.

FIG. 4 is a diagram illustrating an embodiment of a three-dimensionally structured memory block.

Referring to FIG. 4, the memory cell array 10 may include the plurality of memory blocks MB1 to MBk, i.e., the memory blocks 11. The first memory block 11 may include a plurality of memory strings ST11 to ST1m and ST21 to ST2m. Each of the memory strings ST11 to ST1m and ST21 to ST2m may extend in a vertical direction (Z direction). In the memory block 11, 'm' memory strings may be arranged in a row direction (X direction). For convenience of explanation, FIG. 4 illustrates two memory strings arranged in a column direction (Y direction). However, three or more memory strings may be arranged in the column direction (Y direction).

Each of the plurality of memory strings ST11 to ST1m and ST21 to ST2m may include at least one source select transistor SST, first to nth memory cells MC1 to MCn, and at least one drain select transistor DST.

The source select transistor SST of each memory string ST may be coupled between the source line SL and the first to nth memory cells MC1 to MCn. Source select transistors of memory strings arranged in the same row may be coupled to the same source select line. Source select transistors of the memory strings ST11 to ST1m in the first row may be coupled to a first source select line SSL1. Source select transistors of the memory strings ST21 to ST2m in the second row may be coupled to a second source select line SSL2. According to another embodiment, the source select transistors of the memory strings ST11 to ST1m and ST21 to ST2m may be commonly coupled to one source select line.

The first to nth memory cells MC1 to MCn of each memory string may be coupled between the source select transistor SST and the drain select transistor DST. Gates of the first to nth memory cells MC1 to MCn may be coupled to first to nth word lines WL1 to WLn, respectively.

According to an embodiment, at least one of the first to nth memory cells MC1 to MCn may serve as a dummy memory cell. When a dummy memory cell is provided, a voltage or current of the corresponding memory string may be stably controlled. As a result, the reliability of data stored in the memory block 11 may be improved.

The drain select transistor DST of each memory string ST may be coupled between the bit line and the memory cells MC1 to MCn. The drain select transistors DST of the memory strings arranged in the row direction may be coupled to the drain select line which extends in the row direction. The drain select transistors DST of the memory strings ST11 to ST1m in the first row may be coupled to a first drain select line DSL1. The drain select transistors DST of the memory strings ST21 to ST2m in the second row may be coupled to a second drain select line DSL2.

Figure 5:
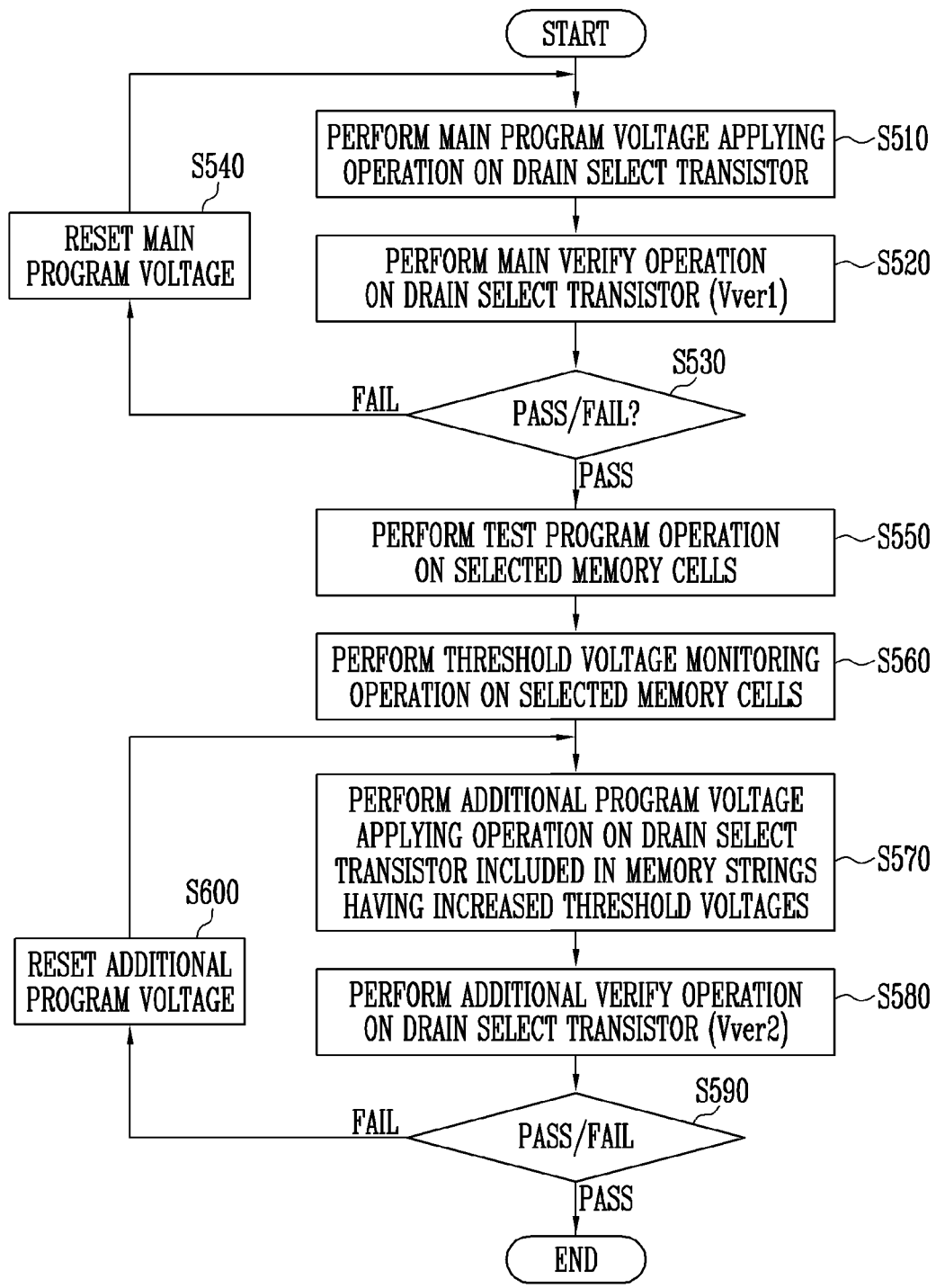
FIG. 5 is a flowchart illustrating a method of operating a semiconductor memory device according to an embodiment of the present disclosure.

FIG. 5 is a flowchart illustrating a method of operating a semiconductor memory device according to an embodiment of the present disclosure.

Figure 6:
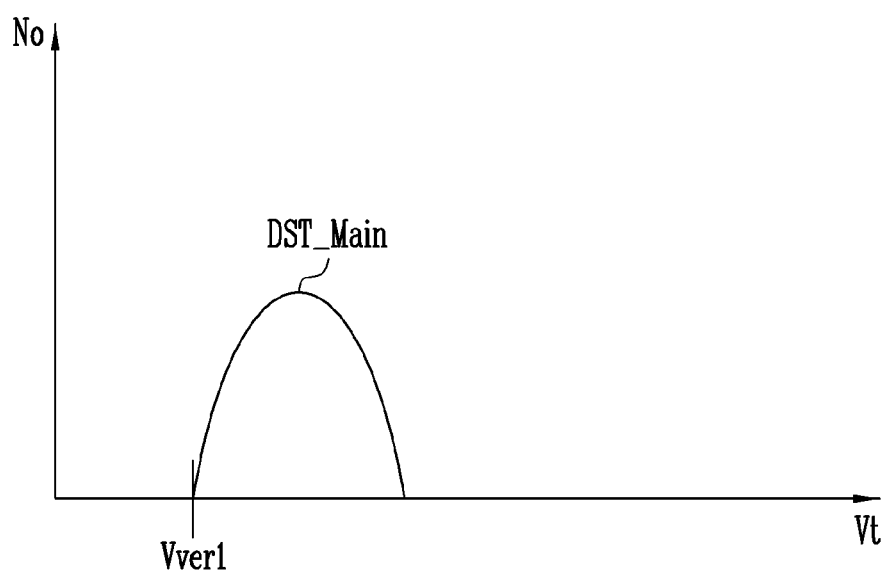
FIG. 6 is a diagram illustrating a threshold voltage distribution after a main program operation of drain select transistors.

FIG. 6 is a diagram illustrating a threshold voltage distribution after a main program operation of drain select transistors.

Figure 7A:
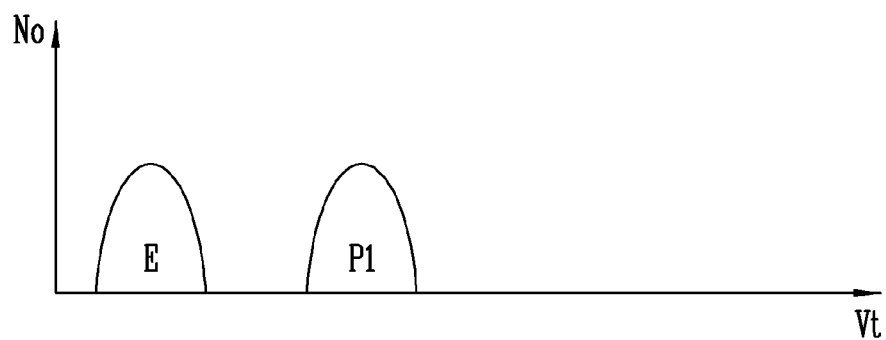
FIGS. 7A and 7B are diagrams illustrating a threshold voltage distribution after a test program operation on memory cells.
Figure 7B:
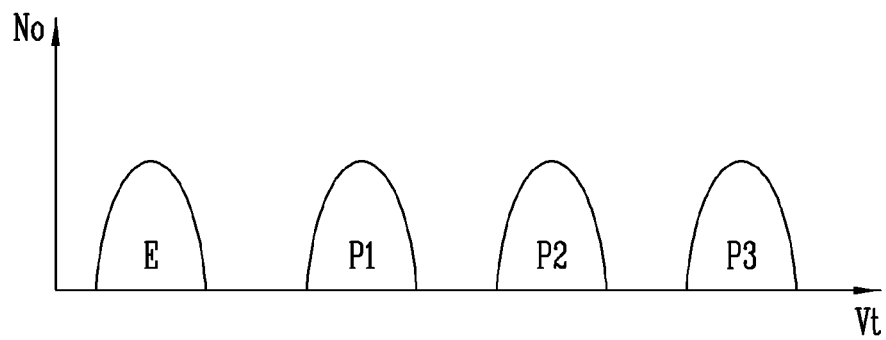

FIGS. 7A and 7B are diagrams illustrating a threshold voltage distribution after a test program operation on memory cells.

Figure 8:
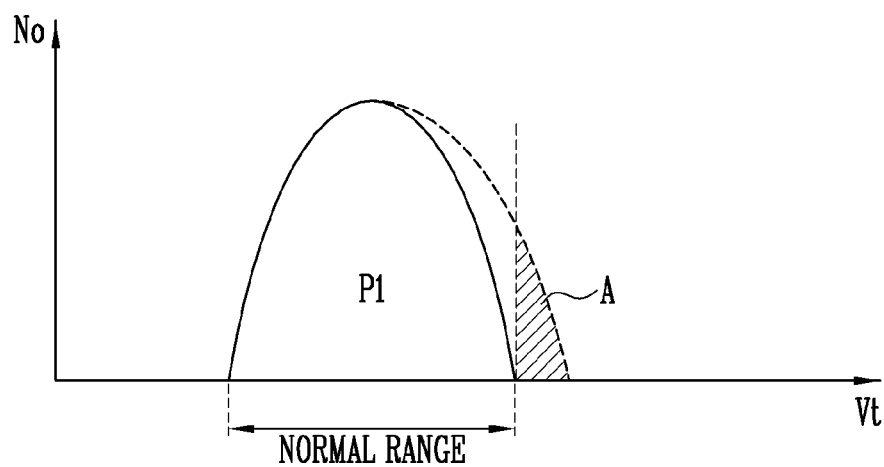
FIG. 8 is a diagram illustrating a threshold voltage distribution monitoring operation of memory cells.

FIG. 8 is a diagram illustrating a threshold voltage distribution monitoring operation of memory cells.

Figure 9:
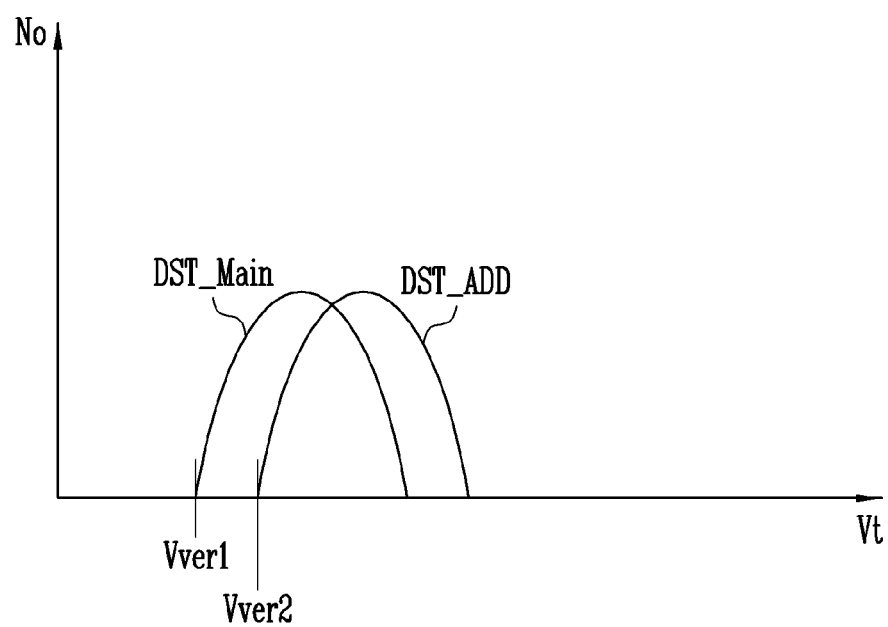
FIG. 9 is a diagram illustrating a threshold voltage distribution after an additional program operation of drain select transistors.

FIG. 9 is a diagram illustrating a threshold voltage distribution after an additional program operation of drain select transistors.

Operations of a semiconductor memory device according to an embodiment of the present disclosure will be described below with reference to FIGS. 2, 3, 5, 6, 7A, 8, and 9.

In an embodiment of the present disclosure, a program operation of the drain select transistors DST which are included in the selected memory block 11 will be described below.

At step S510, a main program voltage applying operation may be performed on the drain select transistors DST which are included in the selected memory block 11.

For example, the page buffer group 230 may apply a program permission voltage to the bit lines BL1 to BLm which are coupled to the selected memory block 11. For example, the program permission voltage may be 0V. The voltage generating circuit 210 may generate a main program voltage. The row decoder 220 may apply the main program voltage generated by the voltage generating circuit 210 to the drain select line DSL of the selected memory block 11. The main program voltage may have a lower potential than a normal program voltage which is applied to word lines during a program operation performed on memory cells included in a memory block.

At step S520, a main verify operation may be performed on the drain select transistors DST included in the selected memory block 11.

For example, the voltage generating circuit 210 may generate a main verify voltage Vver1 and a pass voltage, and the row decoder 220 may apply the main verify voltage Vver1 generated by the voltage generating circuit 210 to the drain select line DSL of the selected memory block 11. In addition, the row decoder 220 may apply the pass voltage generated by the voltage generating circuit 210 to the word lines WL1 to WL16.

The plurality of page buffers PB1 to PBm of the page buffer group 230, i.e., the page buffers 231 may sense amounts of currents or potentials of the bit lines BL1 to BLm corresponding thereto and determine whether or not the drain select transistors DST coupled to the bit lines BL1 to BLm, respectively, have been programmed. In other words, the plurality of page buffers 231 may sense the current amounts or the potential levels of the bit lines BL1 to BLm, respectively, and may determine whether threshold voltages of the drain select transistors DST coupled to the bit lines BL1 to BLm, respectively, are greater or smaller than the main verify voltage Vver1.

At step S530, the control logic 300 may determine pass/fail of the main program operation on the drain select transistors DST on the basis of a result of performing the verify operation at step S520 as above.

For example, each of the plurality of page buffers 231 may generate the sensing voltage VPB by sensing the amounts of current or the potentials of the bit lines BL1 to BLm corresponding thereto. The pass/fail check circuit 260 may generate a reference current in response to the allowable bit VRY_BIT<#> and generate a reference voltage based on the reference current. The allowable bit VRY_BIT<#> may refer to a bit when all drain select transistors DST included in the selected memory block 11 are determined as a program pass. The pass/fail check circuit 260 may output the pass signal PASS or the fail signal FAIL by comparing the sensing voltage VPB with the reference voltage. The control logic 300 may determine pass/fail of the main program operation on the drain select transistors DST based on the pass signal PASS or the fail signal FAIL.

For example, the control logic 300 may determine that the main program operation of the drain select transistors DST passes when all drain select transistors DST included in the selected memory block 11 program-pass, and may determine that the main program operation on the drain select transistors DST fails when at least one drain select transistor DST program-fails.

When all drain select transistors DST included in the selected memory block 11 program-pass, a threshold voltage distribution DST_Main of the drain select transistors DST may be greater than or equal to the main verify voltage Vver1 as shown in FIG. 6.

When it is determined as fail as a result of determination at S530, the main program voltage may be reset at step S540. For example, the control logic 300 may reset a main program voltage generated by the voltage generating circuit 210 as a new main program voltage which is increased by a step voltage. Subsequently, the process flow returns to step S510 above. At step S510 which is carried out again, a program inhibition voltage (e.g., a power voltage) may be applied to the bit lines corresponding to the drain select transistors determined as the pass in the previous main verify operation.

When it is determined as pass as a result of determination at step S530, a test program operation may be performed on memory cells included in at least one physical page PPG which is selected from among the memory cells F1 to F16 included in the selected memory block 11 at step S550.

The test program operation may be performed on at least one physical page PPG selected from among the plurality of physical pages PPG included in the selected memory block 11, or may be performed on all physical pages PPG included in the selected memory block 11.

The test program operation may be performed by a single-level cell (SLC) program method, a multi-level cell (MLC) program method, a triple-level cell (TLC) program method, or a quadruple-level cell (QLC) program method.

Referring to FIG. 7A, when a test program operation is performed by the single-level cell (SLC) program method, memory cells included in at least one selected physical page PPG may be programmed to an erase state E and a first program state P1. According to another embodiment, memory cells included in at least one selected physical page PPG may be programmed to the first program state P1.

Referring to FIG. 7B, when a test program operation is performed by the multi-level cell (MLC) program method, memory cells included in at least one selected physical page PPG may be programmed to an erase state E and the first to third program states P1 to P3. According to another embodiment, memory cells included in at least one selected physical page PPG may be programmed to one program state (e.g., P3) among the first to third program states P1 to P3.

During the test program operation, memory cells included in at least one selected physical page PPG may be randomly programmed to have threshold voltages corresponding to a plurality of program states, respectively, or may be programmed to have a threshold voltage corresponding to one program state. One program state may be defined as a solid program state SPT.

After the above-described step S550 is completed, the semiconductor memory device 100 may perform a threshold voltage monitoring operation S560 on selected memory cells included in at least one selected physical page PPG on which the test program operation has been performed. The threshold voltage monitoring operation S560 may be performed to check memory cells having increased threshold voltages.

A threshold voltage distribution of the selected memory cells included in at least one selected physical page PPG on which the test program operation has been performed may be increased by a program disturb phenomenon. Referring to FIG. 8, some of the memory cells programmed to the first program state P1 may be out of a normal range of a threshold voltage distribution by the program disturb phenomenon during the test program operation. Some of the memory cells which are out of the normal range of the threshold voltage distribution may be defined as disturb susceptible memory cells (A). The threshold voltage monitoring operation S560 may be performed to detect the disturb susceptible memory cells (A) among the selected memory cells on which the test program operation is performed.

For example, the voltage generating circuit 210 may generate a monitoring voltage corresponding to the highest threshold voltage value in the normal range of the threshold voltage distribution, and a pass voltage. In addition, the row decoder 220 may apply the monitoring voltage to the selected word line corresponding to the selected physical page PPG of the selected memory block and may apply the pass voltage to remaining unselected word lines. The page buffer group 230 may detect memory cells having threshold voltages greater than the monitoring voltage among the memory cells included in one physical page PPG corresponding to the selected word line by sensing potential levels or amounts of currents of the bit lines BL1 to BLm.

When there are a plurality of physical pages PPG on which the test program operation has been performed, the above-described threshold voltage monitoring operation S560 may be performed according to each physical page in a sequential manner.

At step S570, an additional program voltage applying operation may be performed on a drain select transistor of a memory string including memory cells whose threshold voltages are increased, among memory strings.

For example, when the test program operation is performed on one physical page PPG, the control logic 300 may detect the memory strings ST including memory cells detected as the disturb susceptible memory cells (A) as a result of the threshold voltage monitoring operation as disturb susceptible memory strings.

In addition, when the test program operation is performed on the plurality of physical pages PPG, the control logic 300 may detect the memory strings ST including a predetermined number or more of the memory cells detected as the disturb susceptible memory cells (A) as the result of the threshold voltage monitoring operation as disturb susceptible memory strings.

The control logic 300 may control the peripheral circuits 200 to perform an additional program voltage applying operation on the drain select transistors DST included in the memory strings ST defected as the disturb susceptible memory strings.

For example, the page buffer group 230 may apply a program permission voltage to bit lines corresponding to the memory strings ST detected as the disturb susceptible memory strings, among the bit lines BL1 to BLm coupled to the selected memory block 11, and may apply a program inhibition voltage to the remaining bit lines. For example, the program permission voltage may be 0V and the program inhibition voltage may be a power voltage VCC. The voltage generating circuit 210 may generate an additional program voltage. The row decoder 220 may apply the additional program voltage generated by the voltage generating circuit 210 to the drain select line DSL of the selected memory block 11. The additional program voltage may have a higher potential level than the main program voltage.

At step S580, an additional verify operation may be performed on the drain select transistors DST included in the disturb susceptible memory string among the drain select transistors DST included in the selected memory block 11.

For example, the voltage generating circuit 210 may generate an additional verify voltage Vver2 and a pass voltage, and the row decoder 220 may apply the additional verify voltage Vver2 generated by the voltage generating circuit 210 to the drain select line DSL of the selected memory block 11. The additional verify voltage Vver2 may have a higher potential level than the main verify voltage Vver1 as shown in FIG. 9. In addition, the row decoder 220 may apply the pass voltage generated by the voltage generating circuit 210 to the word lines WL1 to WL16 of the selected memory block 11.

Page buffers corresponding to the disturb susceptible memory string, among the plurality of page buffers PB1 to PBm of the page buffer group, i.e., the page buffers 231 may determine whether the drain select transistors DST included in the disturb susceptible memory string are programmed or not by sensing amounts of currents or potential levels of the bit lines corresponding to the disturb susceptible memory strings. In other words, the page buffers corresponding to the disturb susceptible memory strings may determine whether threshold voltages of the drain select transistors DST included in the disturb susceptible memory strings are equal to or lower than the additional verify voltage Vver2.

At step S590, the control logic 300 may determine pass/fail of the additional program operation on the drain select transistors DST included in the disturb susceptible memory strings on the basis of a result of performing the verify operation at step S580 as above.

For example, the control logic 300 may determine that the additional program operation passes when all the drain select transistors DST included in the disturb susceptible memory strings are programmed to a state which is greater than the additional verify voltage Vver2. In addition, the control logic 300 may determine that the additional program operation on the drain select transistors DST fails when at least one of the drain select transistors DST program-fails.

When all drain select transistors DST included in the disturb susceptible memory strings of the selected memory block 11 program-pass, a threshold voltage distribution DST_ADD of the drain select transistors DST included in the disturb susceptible memory strings may be greater than or equal to the additional verify voltage Vver2 as shown in FIG. 9. The threshold voltage distribution DST_ADD of the drain select transistors DST included in the disturb susceptible memory strings may be higher than the threshold voltage distribution DST_Main of the drain select transistors DST included in the remaining memory string.

When it is determined as fail as a result of determination at S590, the additional program voltage may be reset at step S600. For example, the control logic 300 may reset the additional program voltage generated by the voltage generating circuit 210 as a new additional program voltage which is increased by a step voltage. Subsequently, the process flow returns to step S570 above. At step S570 which is carried out again, a program inhibition voltage (e.g., a power voltage) may be applied to bit lines corresponding to the drain select transistors determined as the pass in the previous additional verify operation.

According to an embodiment of the present disclosure, at steps S570 to S600, after the additional program voltage applying operation is performed, the additional program voltage applying operation may be performed again by increasing the additional program voltage based on the verify operation result. According to another embodiment, a program operation of a drain select transistor may be terminated by repeating an additional program voltage applying operation a predetermined number of times. In other words, the program operation of the drain select transistor may be terminated after the additional program voltage is applied to a word line corresponding to a selected page a predetermined number of times after step S560.

Figure 10:
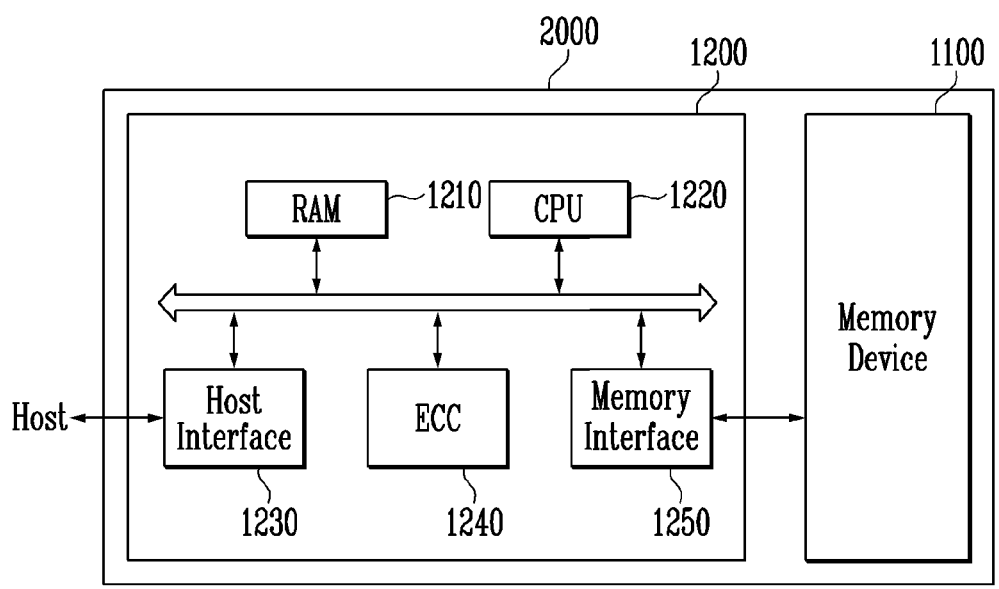
FIG. 10 is a block diagram illustrating the configuration of a memory system according to another embodiment of the present disclosure.

FIG. 10 is a block diagram illustrating a memory system 2000 according to an embodiment of the present disclosure.

As illustrated in FIG. 10, the memory system 2000 according to an embodiment may include a memory device 1100 and a controller 1200.

The memory device 1100 may be used to store various types of data such as text, graphics, and software codes. The memory device 1100 may include a plurality of semiconductor memory devices as described above with reference to FIG. 1. The plurality of semiconductor memory devices may be the semiconductor memory devices which are described above with reference to FIG. 2. Because the memory device 1100 is configured and manufactured in the same manner as described above, a detailed description thereof will be omitted.

The controller 1200 may be coupled to a host and the memory device 1100 and configured to access the memory device 1100 in response to a request from the host. For example, the controller 1200 may control read, write, erase, and background operations of the memory device 1100.

The controller 1200 may include random-access memory (RAM) 1210, a central processing unit (CPU) 1220, a host interface 1230, an error correction code (ECC) circuit 1240, and a memory interface 1250.

The RAM 1210 may serve as operation memory of the CPU 1220, cache memory between the memory device 1100 and the host, and buffer memory between the memory device 1100 and the host. For reference, the RAM 1210 may be replaced with static random-access memory (SRAM), read-only memory (ROM), or the like.

The CPU 1220 may control the overall operation of the controller 1200. For example, the CPU 1220 may operate firmware such as a flash translation layer (FTL) stored in the RAM 1210.

The host interface 1230 may interface with the host. For example, the controller 1200 may communicate with the host through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer system interface (SCSI) protocol, an enhanced small disk interface (ESDI) protocol, and an integrated drive electronics (IDE) protocol, a private protocol, and the like.

The ECC circuit 1240 may use an error correction code (ECC) to detect and correct errors in data read from the memory device 1100.

The memory interface 1250 may interface with the memory device 1100. For example, the memory interface 1250 may include a NAND interface or a NOR interface.

For reference, the controller 1200 may further include buffer memory (not shown) for temporarily storing data. The buffer memory may be used to temporarily store data to be transferred from the host interface 1230 to an external device or data to be transferred from the memory interface 1250 to the memory device 1100. In addition, the controller 1200 may further include ROM that stores code data for interfacing with the host.

Because the memory system 2000 according to an embodiment includes the memory device 1100 having improved integration density and characteristics, the memory system 2000 may also have improved integration density and characteristics accordingly.

According to the present disclosure, disturb susceptible memory strings may be detected based on influence of disturb over memory cells included in a memory string, and select transistors included in the detected disturb susceptible memory strings may be additionally programmed, thereby optimizing a threshold voltage distribution of select transistors.

It will be apparent to those skilled in the art that various modifications can be made to the above-described embodiments of the present teachings without departing from the spirit or scope of the present teachings. Thus, it is intended that the present disclosure covers all such modifications provided they come within the scope of the appended claims and their equivalents.

What is claimed is:

1. A semiconductor memory device, comprising:
a memory block including a plurality of memory strings; and
a peripheral circuit comprising a row decoder and a page buffer;
wherein the peripheral circuit is configured to:
perform a main program operation on drain select transistors included in the memory block;
perform a test program operation and a threshold voltage monitoring operation on memory cells included in the memory block;
detect a disturb susceptible memory string, among the plurality of memory strings, based on a result of performing the threshold voltage monitoring operation on the memory cells; and
perform an additional program operation on a drain select transistor included in the disturb susceptible memory string.

2. The semiconductor memory device of claim 1, wherein the peripheral circuit is configured to perform the test program operation on at least one page among a plurality of pages included in the memory block during the test program operation on the memory cells included in the memory block.

3. The semiconductor memory device of claim 1, wherein the peripheral circuit is configured to program the memory cells by a single-level cell program method, a multi-level cell program method, a triple-level cell program method, or a quadruple-level cell program method during the test program operation on the memory cells included in the memory block.

4. The semiconductor memory device of claim 1, wherein the peripheral circuit is configured to program the memory cells to at least one program state during the test program operation on the memory cells included in the memory block.

5. The semiconductor memory device of claim 1, wherein the peripheral circuit is configured to detect disturb susceptible memory cells having threshold voltages greater than a normal threshold voltage distribution among the memory cells on which the test program operation is performed during the threshold voltage monitoring operation on the memory cells included in the memory block.

6. The semiconductor memory device of claim 1, wherein the peripheral circuit is configured to program threshold voltages of the drain select transistors to be greater than or equal to the main verify voltage during the main program operation.

7. The semiconductor memory device of claim 6, wherein the peripheral circuit is configured to program a threshold voltage of the drain select transistor included in the disturb susceptible memory string to be greater than or equal to the main verify voltage during the additional program operation.

8. A semiconductor memory device, comprising:
a memory block including a plurality of pages; and
a peripheral circuit comprising a row decoder and a page buffer;
wherein the peripheral circuit is configured to:
perform a main program operation on drain select transistors included in the memory block;
perform a test program operation on a selected page among the plurality of pages, and perform a threshold voltage monitoring operation on the selected page;
detect disturb susceptible memory cells on the basis of a result of performing the threshold voltage monitoring operation on the selected page; and
perform an additional program operation on a plurality of drain select transistor corresponding to the disturb susceptible memory cells among the drain select transistors.

9. The semiconductor memory device of claim 8, wherein the peripheral circuit is configured to program memory cells included in the selected page to one solid program state among a plurality of program states during the test program operation.

10. The semiconductor memory device of claim 8, wherein the peripheral circuit is configured to detect the disturb susceptible memory cells having threshold voltages greater than a normal threshold voltage distribution among memory cells included in the selected page on which the test program operation is performed during the threshold voltage monitoring operation.

11. The semiconductor memory device of claim 8, wherein the peripheral circuit is configured to program threshold voltages of the plurality of drain select transistors to be greater than or equal to a main verify voltage during the main program operation.

12. The semiconductor memory device of claim 11, wherein the peripheral circuit is configured to program a threshold voltage of at least one drain select transistor of the drain select transistors included in the memory block to be greater than or equal to the main verify voltage during the additional program operation.

13. A method of operating a semiconductor memory device, the method comprising:
performing a main program operation on a plurality of drain select transistors included in a selected memory block;
performing a test program operation on at least one selected page among a plurality of pages included in the selected memory block;
performing a threshold voltage monitoring operation on the at least one selected page;
detecting a memory string including memory cells having increased threshold voltages as a result of the threshold voltage monitoring operation as a disturb susceptible memory string; and
performing an additional program operation on a drain select transistor included in the disturb susceptible memory string.

14. The method of claim 13, wherein performing the main program operation comprises programming threshold voltages of the plurality of drain select transistors to be greater than or equal to a main verify voltage.

15. The method of claim 14, wherein performing the additional program operation comprises programming a threshold voltage of the drain select transistor included in the disturb susceptible memory string among the plurality of drain select transistors to be greater than or equal to the main verify voltage.

16. The method of claim 13, wherein performing the test program operation comprises programming memory cells included in the at least one select page by a single-level cell program method, a multi-level cell program method, a triple-level cell program method, or a quadruple-level cell program method.

17. The method of claim 13, wherein performing the test program operation comprises programming memory cells included in the at least one selected page to one solid program state among a plurality of program states.

18. The method of claim 13, wherein performing the threshold voltage monitoring operation comprises detecting disturb susceptible memory cells having threshold voltages greater than a normal threshold voltage distribution among memory cells included in the at least one selected page.

19. The method of claim 18, wherein detecting the disturb susceptible memory string comprises detecting a memory string including a predetermined number or more of the disturb susceptible memory cells among a plurality of memory strings included in the selected memory block as the disturb susceptible memory string.

20. The method of claim 18, wherein detecting the disturb susceptible memory string comprises detecting a memory string including at least one of the disturb susceptible memory cells among a plurality of memory strings included in the selected memory block as the disturb susceptible memory string.

* * * * *